(12) United States Patent
Thomas-Alyea et al.

(10) Patent No.: US 10,840,513 B2
(45) Date of Patent: Nov. 17, 2020

(54) SOLID ELECTROLYTE FOR A NEGATIVE ELECTRODE OF A SECONDARY BATTERY AND METHODS FOR THE MANUFACTURE OF AN ELECTROCHEMICAL CELL

(71) Applicant: SAMSUNG ELECTRONICS CO., LTD., Suwon-si (KR)

(72) Inventors: Karen E. Thomas-Alyea, Arlington, MA (US); Robert Ashcraft, Mountain View, CA (US); Lincoln Miara, Cambridge, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 143 days.

(21) Appl. No.: 16/197,713

(22) Filed: Nov. 21, 2018

(65) Prior Publication Data
US 2019/0273258 A1     Sep. 5, 2019

Related U.S. Application Data

(60) Provisional application No. 62/638,783, filed on Mar. 5, 2018.

(51) Int. Cl.
*H01M 4/00* (2006.01)
*H01M 4/60* (2006.01)
(Continued)

(52) U.S. Cl.
CPC ......... *H01M 4/608* (2013.01); *H01M 4/0404* (2013.01); *H01M 10/0525* (2013.01);
(Continued)

(58) Field of Classification Search
CPC ....... H01M 10/052; H01M 2300/0097; H01M 2/164; H01M 10/0585; H01M 4/0421;
(Continued)

(56) References Cited

U.S. PATENT DOCUMENTS 4,239,839 A    12/1980  Mcdowall et al.
4,439,502 A    3/1984   Bittihn et al.
(Continued)

FOREIGN PATENT DOCUMENTS

CN    103579707 A    2/2014
EP    2421081 A1     2/2012
(Continued)

OTHER PUBLICATIONS

Cheng, L. et al.,"Effect of Surface Microstructure on Electrochemical Performance of Garnet Solid Electrolytes", Applied Materials & Interfaces, 2015, 7; pp. 2073-2081.
(Continued)

*Primary Examiner* — Cynthia H Kelly
*Assistant Examiner* — Monique M Wills
(74) *Attorney, Agent, or Firm* — Cantor Colburn LLP

(57) ABSTRACT

A solid electrolyte for a negative electrode of a secondary battery includes a first porous solid electrolyte having a first surface; a first coating on the first surface of the first porous solid electrolyte; an adhesive electrolyte layer on the first porous solid electrolyte; and a second porous solid electrolyte on the adhesive electrolyte layer, the second porous solid electrolyte having a second surface; wherein the first porous solid electrolyte and the second porous solid electrolyte each have an ionic conductivity effective for a deposition metal; and wherein a surface of the first coating is less favorable for deposition of the deposition metal than the second surface of the second solid electrolyte. An electrode assembly and an electrochemical cell including the solid electrolyte and method for the manufacture thereof are also described.

18 Claims, 2 Drawing Sheets

(51) Int. Cl.
*H01M 10/0525* (2010.01)
*H01M 4/04* (2006.01)
*H01M 4/02* (2006.01)

(52) U.S. Cl.
CPC ............. *H01M 2004/027* (2013.01); *H01M 2300/0082* (2013.01)

(58) Field of Classification Search
CPC ........... H01M 4/0404; H01M 10/0525; H01M 2300/0065
See application file for complete search history.

(56) References Cited

U.S. PATENT DOCUMENTS

| | | | |
|---|---|---|---|
| 5,498,489 | A | 3/1996 | Dasgupta et al. |
| 6,413,285 | B1 | 7/2002 | Chu et al. |
| 6,815,121 | B2 | 11/2004 | Dasgupta et al. |
| 7,923,156 | B2 | 4/2011 | Dasgupta et al. |
| 8,697,294 | B1 | 4/2014 | Tsukamoto et al. |
| 8,734,989 | B2 | 5/2014 | Lee et al. |
| 8,778,546 | B2 | 7/2014 | Farmer |
| 9,437,370 | B2 | 9/2016 | Chen et al. |
| 9,761,882 | B2 | 9/2017 | Lopatin et al. |
| 2014/0011100 | A1 | 1/2014 | Lee et al. |
| 2014/0079994 | A1 | 3/2014 | Affinito et al. |
| 2014/0287305 | A1 | 9/2014 | Wachsman et al. |
| 2014/0363744 | A1 | 12/2014 | Vereecken et al. |
| 2015/0111110 | A1 | 4/2015 | Watanabe et al. |
| 2016/0301102 | A1 | 10/2016 | Zhamu et al. |
| 2017/0338522 | A1 | 11/2017 | Hu et al. |
| 2018/0166743 | A1* | 6/2018 | Lee ........................ H01M 2/166 |
| 2018/0205112 | A1 | 7/2018 | Thomas-Alyea et al. |

FOREIGN PATENT DOCUMENTS

| | | |
|---|---|---|
| FR | 3034258 A1 | 9/2016 |
| JP | 2009238576 | 10/2009 |
| JP | 4927609 | 5/2012 |
| JP | 5246538 B2 | 7/2013 |
| JP | 2014192041 A | 10/2014 |
| KR | 101561605 B1 | 10/2015 |
| WO | 2017116599 | 7/2017 |

OTHER PUBLICATIONS

Dunn, Bruce, "Effect of Air Exposure on the Resistivity of Sodium Beta and Beta Aluminas", Journal of the American Ceramic Society, vol. 64, No. 3, Mar. 1981; pp. 125-128.

Han et al., "Negating Interfacial impedance in garnet-based solid-state Li metal batteries", Nature Materials, vol. 16, May 2017; pp. 572-580.

Luo, W. et al.,"Transition from Superlithiophobicity to Superlithiophilicity of Garnet Solid-State Electrolyte", J. Am. Chem. Soc. 2016, 138; pp. 12258-12262.

Newman, J. et al., "Electrochemical Systems", 3rd edition, John Wiley & Sons, Hoboken, NJ, 2004, eq. 22.25; pp. 528-529.

Supporting Information for the article by Zhou, Weidong et al., "Plating Dendrite-Free Lithium Anode with a Polymer/Ceramic/Polymer Sandwich Electrolyte", published in J. Am. Chem. Soc. 2016; 138, pp. 9385-9388, pp. S1-S7.

Zhou, Weidong et al., "Plating Dendrite-Free Lithium Anode with a Polymer/Ceramic/Polymer Sandwich Electrolyte", J. Am. Chem. Soc. 2016; 138, pp. 9385-9388.

Sharafi, A. et al., "Surface Chemistry Mechanism of Ultra-Low Interfacial Resistance in the Solid-State Electrolyte Li7La3Zr2O12", Chem.Mater. DOI 10.1021/acs.chemmater.7b03002; Received Jul. 18, 2017; pp. A-H.

Sharafi, A. et al., "Surface Chemistry Mechanism of Ultra-Low Interfacial Resistance in the Solid-State Electrolyte Li7La3Zr2O12", Chem.Mater. DOI 10.1021/acs.chemmater.7b03002; pp. A-H.

* cited by examiner

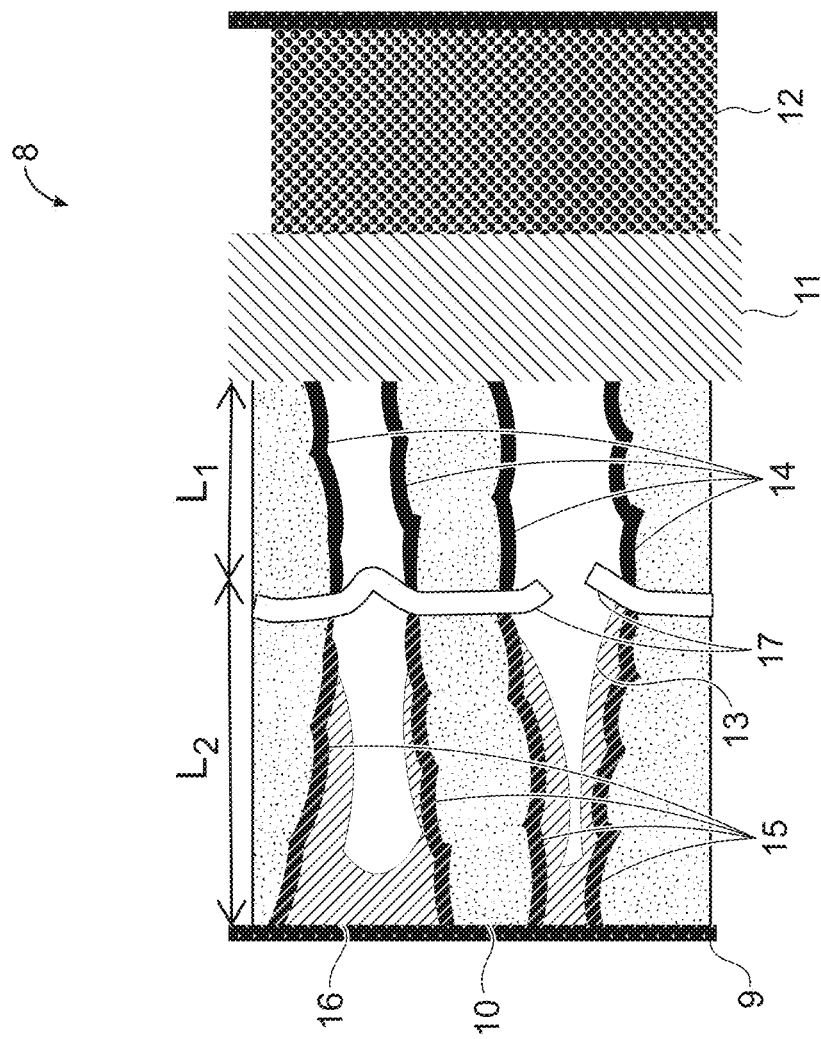

SOLID ELECTROLYTE FOR A NEGATIVE ELECTRODE OF A SECONDARY BATTERY AND METHODS FOR THE MANUFACTURE OF AN ELECTROCHEMICAL CELL

CROSS REFERENCE TO RELATED APPLICATION

This application claims the benefit, under 35 U.S.C. § 119(e), of U.S. Provisional Patent Application Ser. No. 62/638,783, filed on Mar. 5, 2018, the content of which is incorporated herein by reference in its entirety.

BACKGROUND

There has been an increasing demand for a secondary battery having improved performance for stationary and mobile applications. Batteries with metal negative electrodes are attractive because they can provide high energy density. Lithium, sodium, and magnesium batteries using a liquid organic electrolyte have been considered, however they present a number of performance and safety issues. Solid-state electrolytes offer improved safety over liquid electrolytes, however robustness sufficient for commercialization has not yet been demonstrated. In particular, when currently available cells with solid electrolytes are cycled short-circuits are observed after some number of cycles, believed to be caused by the depositing metal penetrating across the separator, resulting in a loss in performance and potentially unacceptable safety properties.

Therefore, in order to overcome the technical challenges associated with batteries with metal negative electrodes, there remains a need for an improved solid electrolyte.

SUMMARY

A solid electrolyte for a negative electrode of a secondary battery comprises a first porous solid electrolyte having a first surface; a first coating on the first surface of the first porous solid electrolyte; an adhesive electrolyte layer on the first porous solid electrolyte; and a second porous solid electrolyte on the adhesive electrolyte layer, the second porous solid electrolyte having a second surface; wherein the first porous solid electrolyte and the second porous solid electrolyte each have an ionic conductivity effective for a deposition metal; wherein a surface of the first coating is less favorable for deposition of the deposition metal than the second surface of the second solid electrolyte.

An electrode assembly for an electrochemical cell comprises the solid electrolyte; a separator disposed on the first porous solid electrolyte of the solid electrolyte; and a current collector disposed on the second porous solid electrolyte of the solid electrolyte.

An electrochemical cell comprises a positive electrode; a separator disposed adjacent to the positive electrode; negative electrode comprising a first porous solid electrolyte adjacent to the separator and opposite the positive electrode, the first porous solid electrolyte having a first surface, a first coating on the first surface of the first solid electrolyte, an adhesive electrolyte layer on the first porous solid electrolyte, a second porous solid electrolyte adjacent to the adhesive electrolyte layer and opposite the first porous solid electrolyte, the second porous solid electrolyte having a second surface, and a current collector disposed on the second porous solid electrolyte and opposite the adhesive electrolyte layer, wherein a surface of the first coating is less favorable for deposition of lithium metal than the second surface of the second solid electrolyte.

A method of manufacturing a negative electrode assembly comprises providing a buffer region subassembly comprising a nonporous separator; and a first solid electrolyte having a first surface on the nonporous separator, the first solid electrolyte having a first coating on the first surface; providing an anode region subassembly comprising a current collector; and a second solid electrolyte having a second surface on the current collector; disposing an adhesive electrolyte layer on the buffer region or the anode region; and disposing the other of the buffer region and the anode region on the adhesive electrolyte layer to adhere the buffer region subassembly to the anode region subassembly and form the negative electrode assembly.

A method of manufacturing an electrochemical cell comprises disposing a positive electrode on the negative electrode assembly made by the above method to provide the electrochemical cell.

A method of manufacturing a negative electrode assembly for a lithium battery comprises providing a nonporous separator; disposing a first porous solid electrolyte having a first surface on the nonporous separator, the first solid electrolyte having a first coating on the first surface; providing a current collector; disposing a second porous solid electrolyte on the current collector to form an anode region subassembly, the second porous solid electrolyte having a second surface, wherein a surface of the first coating is less favorable for deposition of the deposition metal than the second surface of the second solid electrolyte; and disposing an adhesive electrolyte between the buffer region subassembly and the anode region subassembly to adhere the buffer region subassembly to the anode region subassembly and form the negative electrode assembly.

A method of manufacturing an electrochemical cell comprises providing a negative electrode assembly comprising a first solid electrolyte having a first surface, a first coating on the first surface of the first solid electrolyte, an adhesive electrolyte layer on the first solid electrolyte, and a second solid electrolyte on the adhesive electrolyte layer, the second solid electrolyte having a second surface, wherein the first solid electrolyte and the second solid electrolyte each have an ionic conductivity effective for a deposition metal, and wherein a surface of the first coating is less favorable for deposition of the deposition metal than the second surface of the second solid electrolyte; and disposing a positive electrode on the nonporous separator to manufacture the electrochemical cell.

The above described and other features are exemplified by the following figures and detailed description.

BRIEF DESCRIPTION OF THE DRAWINGS

The following figures are exemplary embodiments wherein the like elements are numbered alike.

FIG. 2 is a schematic illustration of an embodiment of an electrochemical cell with a porous solid electrolyte, a surface favorable for metal deposition adjacent to the current collector, and a surface unfavorable for deposition adjacent to the separator, and an adhesive electrolyte layer between the first porous solid electrolyte and the second porous solid electrolyte.

DETAILED DESCRIPTION

Figure 1:
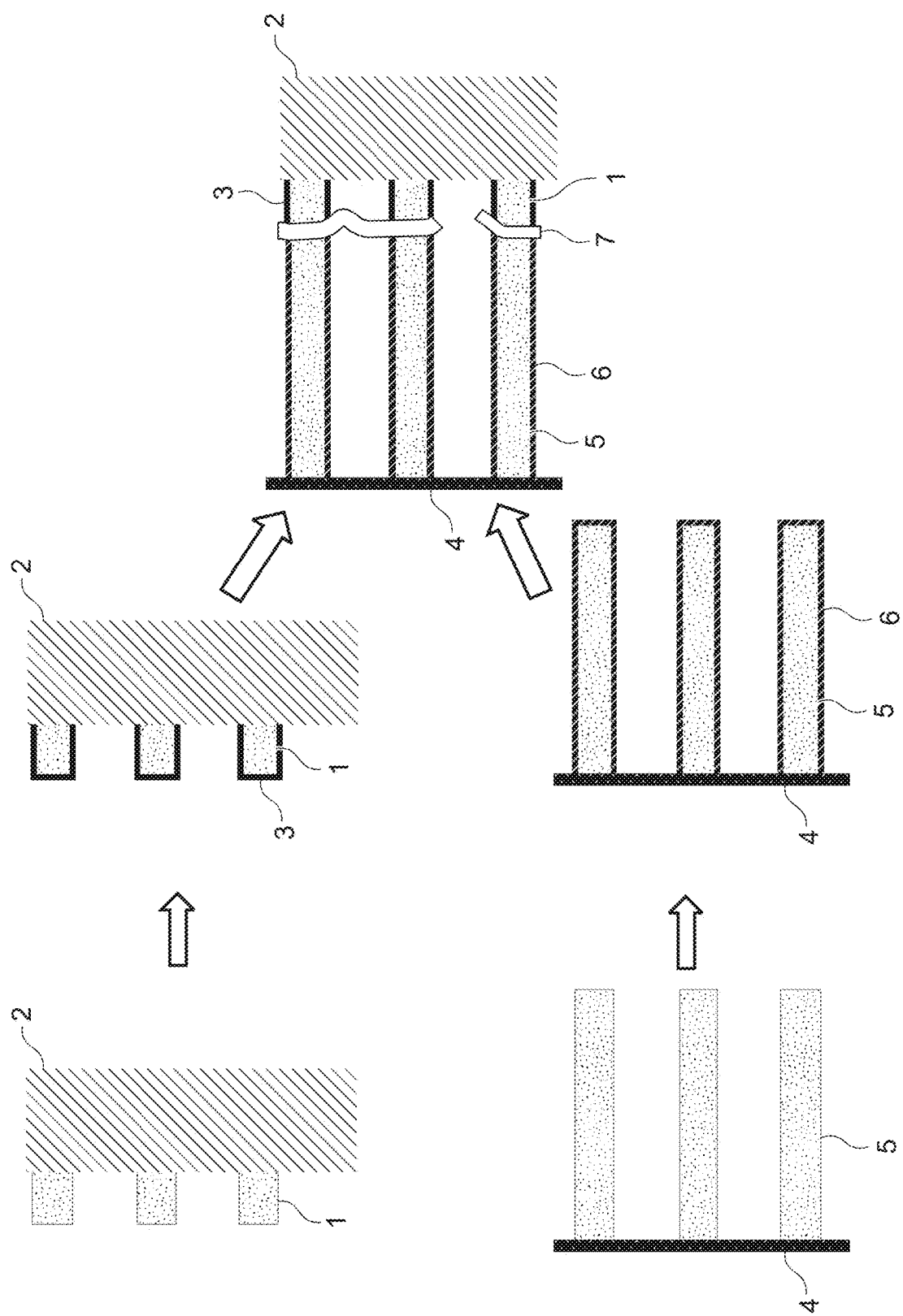
FIG. 1 is a schematic illustration of an exemplary method of manufacturing the negative electrode assembly.

Porous solid electrolytes have been proposed for batteries with metal-deposition negative electrodes. See, e.g., U.S.

Pat. No. 4,439,502, which includes examples for sodium-metal batteries, and U.S. Publication No. 2014/0287305, which includes examples for lithium-metal batteries. While not wanting to be bound by theory, as the cell is charged and discharged, the metal deposits into the void space of the porous solid electrolyte. Initially, the metal is understood to preferentially deposit at the interface between the current collector and the solid electrolyte. The deposited metal is understood to then grow along the surface of the solid electrolyte. However, once enough metal has deposited to create a percolating path for electrons, the metal is understood to preferentially deposit close to the separator because the ionic conductivity of the electrolyte is less than the electronic conductivity of the metal. It is further understood that metal deposited adjacent to the separator will cause mechanical stress in the separator, and over time that stress will cause fatigue of the separator, enabling the deposited metal to grow through weak regions of the separator.

In addition, because the metal may not plate at 100% density (e.g., there may be void regions into which the metal does not grow), because there are tolerances in cathode capacity, and because in-plane current gradients cause redistribution of metal in large cells particularly with thermal gradients, the negative electrode desirably has a design margin to accommodate any extra metal in such a way that the extra metal does not cause stress in the separator.

Fabrication of a porous solid electrolyte containing regions that are favorable and unfavorable for metal (e.g., lithium) deposition can be facilitated by making the two porous electrolyte layers separately and then adhering them together, e.g., through the use of an adhesive layer. In order to maintain ionic transport from one region to the other, the adhesive should be an ionic conductor, e.g., an electrolyte.

The present inventors have disclosed a porous solid electrolyte for use with metal deposition electrodes that can overcome the above-described technical challenges, and have discovered that an adhesive electrolyte layer can be used to facilitate manufacture of the solid electrolyte. The present disclosure provides robust protection against internal shorts in batteries by providing an internal buffer region located between a porous metal negative electrode and the separator, where the buffer region includes an ionic conductor and a void space. Preferably, the ionic conductor in the buffer region has a surface that is more poorly wetted by the depositing metal, a higher charge transfer resistance for metal deposition, or is otherwise less favorable for metal deposition than the ionic conductor in the porous negative electrode. Advantageously, by making the deposition of the metal less favorable in a region adjacent the separator than in a region adjacent a current collector, the metal is driven to preferentially deposit proximate to the current collector and away from the separator, thereby avoiding stress on the separator. In contrast, for a porous anolyte without a buffer layer, during charging, the metal will preferentially deposit close to the separator, because the ionic conductivity of the electrolyte is less than the electronic conductivity of the metal. Metal deposited adjacent to the separator is understood to cause mechanical stress in the separator. Over time, that stress is understood to cause fatigue of the separator, enabling the metal to grow through a weak region of the separator. In a further advantageous feature, the inclusion of the adhesive electrolyte layer can facilitate manufacture of the electrolyte by allowing each of the regions to be prepared separately and then adhered together. Thus, a significant improvement in the structure of porous solid electrolytes for use with metal deposition negative electrodes is provided by the present disclosure.

Accordingly, an aspect of the present disclosure is a solid electrolyte for a negative electrode of a secondary battery. The solid electrolyte comprises a first solid electrolyte having a first surface, a first coating on the first surface of the first porous solid electrolyte, and a second solid electrolyte disposed on the adhesive electrolyte layer, the second solid electrolyte having a second surface. The first coating has a surface that is less favorable for deposition of a deposition metal than the second surface of the second solid electrolyte. The first and second solid electrolytes can be, for example, as described in U.S. patent application Ser. No. 15/869,743, which is herein incorporated by reference in its entirety.

The first and second solid electrolytes each have an ionic conductivity effective for a deposition metal. The deposition metal can be lithium (Li), sodium (Na), potassium (K), magnesium (Mg), zinc (Zn), silver (Ag), aluminum (Al), or a combination thereof. In an embodiment, the deposition metal can preferably comprise Li, Na, Mg, or combination thereof. In a specific embodiment, the deposition metal is Li. For example, the first solid electrolyte and the second solid electrolyte can each independently have suitable ionic conductivity for Li, Na, K, Mg, Zn, Ag, Al, or a combination thereof. The minimum conductivity of the electrolyte for metal deposition depends on the application requirements for energy and power density. In general, the conductivity can be at least $10^{-3}$ S/m, for example, 0.01 to 10 S/m, or 0.1 to 10 S/m (at room temperature, e.g., about 23° C.).

In an embodiment, the first solid electrolyte, the second solid electrolyte, or both, are porous. In an embodiment, the first solid electrolyte is porous. In a specific embodiment, the first solid electrolyte and the second solid electrolyte are porous. The porous structure of the electrolyte can refer to an electrolyte having micro- and/or nanostructural features, e.g., microporosity and/or nanoporosity. For example, the porosity of the first solid electrolyte and the second solid electrolyte regions can independently be 10 to 90%, or 20 to 80%, or 30 to 70%, including all intermediate values and ranges. The porosity of the first solid electrolyte and the second solid electrolytes can be the same or different. As used herein, "pores" can also refer to "voids." For example, in an embodiment, the first solid electrolyte and the second solid electrolyte can comprise a void, wherein the void extends through the first solid electrolyte and the second solid electrolyte (for example, when the solid electrolyte is disposed between a current collector and a separator in an electrode assembly, as further described below, the void extends through the first solid electrolyte and the second solid electrolyte from the separator to the collector). The void is defined by the first surface of the first solid electrolyte or the second surface of the second solid electrolyte. The continuity of the void can be interrupted by the adhesive electrolyte layer, for example as shown in FIG. 2. In an embodiment, the porosity or voids in the first and second solid electrolytes can be further described in terms of the volume fraction of the electrolyte material present in a given region. For example, the electrolyte can comprise a first region comprising the first solid electrolyte and a second region comprising the second solid electrolyte. The volume fraction of the first solid electrolyte in the first region can be 0.2 to 0.95, based on the total volume of the first region. The volume fraction of the second solid electrolyte in the second region can be 0.1 to 0.5, based on the total volume of the second region.

The first region comprising the first solid electrolyte can have a length $L_1$ and the second region comprising the second solid electrolyte can have a length $L_2$, and the length $L_1$ is preferably less than or equal to $L_2$. In some embodiments, a ratio of $L_1:L_2$ can be, for example, 0.01 to 1, or 0.1 to 1.

In an embodiment, the surface area of the first surface can be less than or equal to the surface area of the second surface. For example, the ratio of the surface area of the first surface to the surface area of the second surface can be, for example, 0.01 to 1, or 0.1 to 1. Surface area of the first and second surface can be determined using, for example, scanning electron microscopy (SEM) or nitrogen absorption. Details of such methods, which can be determined without undue experimentation, are not further disclosed for clarity.

The first solid electrolyte and the second solid can each independently comprise a glass, a ceramic, a polymer, or a combination thereof. In an embodiment, the deposition metal is lithium and the first solid electrolyte and the second solid can each independently comprise a lithium ceramic or a glass ceramic. The lithium ceramic or glass ceramic can comprise, for example, a garnet-type oxide. The garnet-type oxide can be of the formula $L_{5+x}E_3(Me_zM_{2-z})O_d$ wherein L is a monovalent cation or a divalent cation, and provided that at least a part of or all of L is Li; E is a trivalent cation; Me and M are each independently one of a trivalent, tetravalent, pentavalent, and a hexavalent cation; $0<x\leq 3$, $0\leq z<2$, and $0<d\leq 12$; and 0 can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when $0<x\leq 2.5$, E may be La and M can be Zr.

In an embodiment, the garnet-type oxide can be of the formula $L_{5+x+2y}(D_yE_{3-y})(Me_zM_{2-z})O_d$ wherein L is a monovalent cation or a divalent cation, and provided that at least a part of or all of L is Li; D is a monovalent or divalent cation; E is a trivalent cation; Me and M are each independently a trivalent, tetravalent, pentavalent, or a hexavalent cation; $0<x+2y\leq 3$, $0<y\leq 0.5$, $0\leq z<2$, and $0<d\leq 12$; and O can be partially or totally substituted with a pentavalent anion, a hexavalent anion, a heptavalent anion, or a combination thereof.

The preferred number of moles of lithium per formula unit (Li-pfu) in the above formula is $6<(5+x+2y)<7.2$, $6.2<(5+x+2y)<7$, $6.4<(5+x+2y)<6.8$.

In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), Zinc (Zn), or chromium (Cr). In the above formulas, L can be lithium (Li), sodium (Na), aluminum (Al), gallium (Ga), magnesium (Mg), potassium (K), or hydrogen (H). For example, L can be Li and monovalent and/or divalent ions such as Na, Mg, and the like. In an embodiment, L is Li; D comprises Ca, Ba, Sr, or Rb; and Me is Ta, Ga, Al, W, Nb. In a specific embodiment, the lithium ceramic or glass ceramic can be of the formula $Li_{6.5}La_3Zr_{1.5}Ta_{0.5}O_{12}$.

The lithium ceramic or glass ceramic can also comprise an antiperovskite structure having the general formula $A_3RX$ wherein A is Li or Na; X is Cl, Br, I, or a super halide such as $BH_4$ or $BF_4$; and R is O or S. An exemplary antiperovskite is $Li_3OCl$.

The lithium ceramic or glass ceramic can also comprise a phosphate-type solid electrolyte such as a NASICON structure of the general formula $Li_{1\pm x}M1_xM2_{2-x}(PO_4)_3$, wherein M1 is Al, Ga, In, Sc, Cr, Fe, Ta, or Nb; M2 is Ti, Zr, Hf, Si, or Ge, and wherein the number of moles of lithium per formula unit is $0<x<2$, $0.2<(1\pm x)<1.8$, $0.4<(1\pm x)<1.6$. For example, the NASICON structure can be $LiTi_2(PO_4)_3$, $Li_{1+x}Al_xGe_{2-x}(PO_4)_3$(LAGP), $Li_{1+x}Al_xTi_{2-x}(PO_4)_3$ (LATP), $Li_{1+x}Ti_{2-x}Al_xSi_y(PO_4)_{3-y}$, $Li_{1-x}Ti_{2-x}Ta_x(PO_4)_3$ wherein $0<x<1$ and $0\leq y<1$, $LiAl_xZr_{2-x}(PO_4)_3$, and $LiTi_xZr_{2-x}(PO_4)_3$ wherein $0<x<2$.

The lithium ceramic or glass ceramic can also comprise an oxide-type solid electrolyte such as a perovskite structure having the general formula $(La_{1-x}Li_x)TiO_3$(LLTO) wherein $0<x<1$.

The lithium ceramic or glass ceramic can also comprise a sulfide or glassy sulfide such as $Li_6PS_5X$ wherein X is Cl, Br, or I, $Li_{10}MP_2S_{12}$ wherein M is Ge, Si, or Sn; $Li_2S$—$P_2S_5$, $Li_2S$—$P_2S_5$—$L_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, or $Li_3PS_4$, $Li_7P_3S_{11}$.

The lithium ceramic or glass ceramic can also comprise $Li_3N$, $Li_2S$, $LiBH_4$, or $Li_3BO_3$, optionally including derivatives with dopants on the cation or anion sites.

Preferably, the first solid electrolyte and the second solid can be a garnet-type oxide, and more preferably, can comprise $Li_7La_3Zr_2O_{12}$. Optionally, any of the foregoing can further comprise one or more dopants, for example selected from Al, Ge, Ga, W, Ta, Nb, Ca, Y, Fe, or a combination thereof, wherein the dopant, if present, is contained in an amount of greater than 0 to 3 moles per formula unit in the unit formula $Li_7La_3Zr_2O_{12}$ on the La-site, and greater than 0 to 2 moles per formula unit on the Zr site.

In an embodiment, the deposition metal can be sodium, and the first solid electrolyte and the second solid can each independently comprise an oxide-type solid electrolyte such as sodium $\beta$-$Al_2O_3$ or NASICON ($Na_{1+x}Zr_2Si_xP_{3-x}O_{12}$, $0<x<3$); a sulfide type (e.g., $Na_3PS_4$); a closo-borate; or a polymer electrolyte such as poly(ethylene oxide) with a dissolved salt such as $NaAsF_6$.

In an embodiment, the deposition metal can be magnesium, and the first solid electrolyte and the second solid electrolyte can each independently comprise an inorganic solid electrolyte such as $MgM_2Z_4$ wherein M is In, Y, or Sc; and Z is S or Se; $Mg_3Bi_2$; or $Mg_{1-2x}(Zr_{1-x}Nb_x)_4P_6O_{24}$ wherein $0<x<1$.

The bulk composition of the first and second solid electrolytes can be the same or different. As used herein, the term "bulk composition" refers to the overall composition of the first solid electrolyte excluding the first surface or the overall composition of the second solid electrolyte excluding the second surface. In an embodiment, the composition of the first and second solid electrolytes are the same. For example, in a specific embodiment, the first solid electrolyte and the second solid electrolyte can each comprise $Li_7La_3Zr_2O_{12}$ (LLZO). In an embodiment, the first solid electrolyte composition can be selected to form a solid electrolyte interphase that has low ionic conductivity, and the second solid electrolyte can be selected to be thermodynamically stable in the presence of lithium metal, or to form a solid electrolyte interphase that has high ionic conductivity.

In an embodiment, the first solid electrolyte and the second solid electrolyte can have different morphologies. The morphology of the first solid electrolyte and the second solid electrolyte can each independently be fibrillar, columnar, irregular spheroids, or any other morphology which is generally known, and preferably which forms a percolating network (i.e., to provide a porous solid electrolyte). For example, in an embodiment, the second solid electrolyte can be fibrillar or of a morphology having a high surface area, while the first solid electrolyte can have a lower aspect ratio to allow for a higher volume fraction of the first solid electrolyte, effectively reducing transport resistance.

The first and second solid electrolytes comprise a first and second surface, respectively, as discussed above. The first and second surfaces can have a composition that is the same or different as the bulk composition of the first and second solid electrolytes, respectively. In an embodiment, the first surface can have a composition that is different from the bulk composition of the first solid electrolyte, and the second surface can have a composition that is different from the bulk composition of the second solid electrolyte. In an embodiment, the first surface and the second surface can each independently further comprise a first coating or second coating, respectively, wherein the first coating and the second coating can each comprise carbonate, a halogen, an oxide, a polymer, a silicide, a phosphide, a sulfide, a metal of Groups 2 to 16, or a combination thereof.

In an embodiment, the first surface, the second surface, or both can further comprise a coating comprising a polymer. The polymer of the first coating of the first surface is preferably ionically and electronically insulating, stable in the presence of the deposition metal (e.g., lithium) or forms an electronically and ionically insulating and stable passivation layer, and is capable of being applied uniformly over the first surface. For example, the polymer can comprise a polyacetal, a polyolefin, a poly(alkylene oxide), a poly(meth)acrylate, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, a polyvinylidene fluoride, or a combination thereof. In some embodiments, the polymer of the first coating of the first surface comprises polyethylene, polypropylene, polystyrene, poly(ethylene oxide), poly(methyl methacrylate), poly(imide), or a combination thereof.

In contrast, in an embodiment, the polymer of the second coating on the second surface, when present, is preferably ionically conductive, stable in the presence of the deposition metal or forms an ionically conductive and stable passivation layer, and has low surface energy with the deposition metal. Exemplary polymers can include, but are not limited to, polyethylene oxide doped with a lithium salt, poly(methyl methacrylate) ("PMMA"), polypropylene oxide ("PPO"), polyvinylidene fluoride ("PVdF"), polystyrene ("PS"), polyvinyl chloride ("PVC"), polyvinyl alcohol ("PVA"), polyacrylonitrile ("PAN"), polyester sulfide ("PES"), derivatives thereof, other polymers comprising ion dissociable groups, and the like, or a combination thereof. In an embodiment, the polymer of the second coating on the second surface can be a poly(ethylene oxide) doped with a lithium salt, wherein the lithium salt can comprise, for example, $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like, or a combination thereof. In an embodiment, the polymer of the second coating on the second surface can be a poly(ethylene oxide) doped with a sodium salt, for example, $NaAsF_6$.

In an embodiment, the first surface and the second surface each independently can further comprise a coating comprising a carbonate, a halogen, an oxide, a polymer, or combination thereof. Also, the first surface and the second surface can each independently comprise a coating comprising an oxide, a silicide, a phosphide, a sulfide, an aluminum oxide, magnesium, niobium, gold, silver, calcium, indium, tin, antimony, zinc, a polymer, or a combination thereof.

In an embodiment, the first surface further comprises the first coating comprising a carbonate, a halogen, an oxide, a polymer, or combination thereof. For example, the first coating can comprise lithium carbonate, lithium fluoride, lithium oxide, lanthanum oxide, zirconium oxide, lanthanum zirconium oxide, hafnium oxide, calcium oxide, gadolinium oxide, samarium oxide, yttrium oxide, or a combination thereof.

It is desirable for the second surface to have a low surface energy with the deposition metal (e.g., lithium) and with the second solid electrolyte, to be non-reactive towards the second solid electrolyte, and to have a high diffusivity for the deposition metal (e.g., lithium). Thus, in some embodiments, the second surface can optionally further comprise a second coating comprising an oxide, a silicide, a phosphide, a sulfide, an aluminum oxide, magnesium, niobium, gold, silver, calcium, indium, tin, antimony, zinc, a polymer, or a combination thereof. For example, the second coating can further comprise lithium oxide, lithium silicide, lithium phosphide, lithium sulfide, lithium aluminum oxide, a lithium-magnesium alloy, lithium nitride, a lithium-niobium alloy, a lithium-gold alloy, a lithium-silver alloy, a lithium-aluminum alloy, a lithium-calcium alloy, a lithium-indium alloy, a lithium-tin alloy, a lithium-antimony alloy, a lithium-zinc alloy, or a combination thereof.

The first surface and the second surface can be different in composition, structure, or both.

In an embodiment, the amount, e.g., thickness, of any coating disposed on the first surface as described above can be different from the amount of any coating disposed on the second surface. Stated another way, the mass ratio of a first coating disposed on the first surface relative to the first solid electrolyte can be different from the mass ratio of a second coating disposed on the second surface relative to the second solid electrolyte. In an embodiment, the mass ratio can decrease continuously across the first region comprising the first solid electrolyte, with the mass ratio of this region being the lowest where the first region meets the second region, and being highest at a side of the first region opposite the second region. In an embodiment, the content of the coating is in the form of a gradient which varies in a direction from the separator and to the current collector. In an embodiment, the thickness of the coating is greatest adjacent the separator. Alternatively, the content of the coating can be greatest adjacent the current collector. In an embodiment, the mass ratio of the coating to the electrolyte can change in a stepwise manner from the first region comprising the first electrolyte to the second region comprising the second electrolyte. In an embodiment, the coating can be a product of the reaction of an oxide electrolyte with water and/or carbon dioxide, for example, from exposing the electrolyte surface to humid air to form a metal carbonate, such as $Li_2CO_3$ or $Na_2CO_3$. A metal carbonate can have a low conductivity and a high surface energy with the metal. Therefore, it can be desirable to have a coating of, for example, $Li_2CO_3$ on the first surface and have no $Li_2CO_3$ on the second surface. However, it can be difficult to avoid all exposure of the second surface to air during fabrication of the second electrolyte and during assembly of the second electrolyte into a battery. Therefore, the second surface can contain trace amounts of metal carbonate. Thus in an embodiment, the first surface and second surface can both contain metal carbonate. The metal carbonate coating can be several nanometers thick on the first surface. The metal carbonate coating can be present in trace patches on the second surface.

The first coating and, when present, the second coating can be disposed on the first and second surfaces, respectively using any suitable method which can be selected depending on the identity of the coating composition. Exemplary methods can include, for example, atomic layer deposition, chemical vapor deposition, sputtering, plating, chemical solution deposition, spin coating, dip coating, physical vapor deposition, and the like or a combination thereof. Additional methods can include, as described above, reaction of an oxide electrolyte with carbon dioxide to form the corresponding metal carbonate as a coating on the surface of the bulk oxide electrolyte.

In an embodiment, the first surface and the second surface can be the same compositionally, but can be different structurally. For example, in an embodiment the first surface can have a crystal structure that is different from the crystal structure of the second surface. In a specific embodiment, the first surface and the second surface can each comprise LLZO, and the first surface can comprise LLZO having a tetragonal symmetry, and the second surface can comprise LLZO having a cubic symmetry.

The solid electrolyte of the present disclosure can have a thickness in a range of 10 to 1,000 micrometers ($\mu m$), preferably in a range of 1 $\mu m$ to 500 $\mu m$, or 10 $\mu m$ to 100 $\mu m$. The solid electrolyte having a thickness within the disclosed range can have improved mechanical strength and flexibility and excellent ion conductivity.

Each of the first and second solid electrolytes can independently further comprise a binder. Examples of suitable binders can include compounds generally used in forming the lithium ion secondary battery, such as polyvinylidene fluoride (PVDF), polypropylene, carboxymethylcellulose (CMC), starch, hydroxypropylcellulose, polyvinylpyrrolidone, polyethylene, ethylene-propylene-diene terpolymer (EPDM), polyvinyl alcohols, styrene butadiene rubber, fluoro rubber, various copolymers thereof, and combinations thereof. For example, the first solid electrolyte and the second solid electrolyte can each independently include PVDF as a binder. Since PVDF has a flexible mechanical property, a thin and flexible electrolyte having excellent ion conductivity can be prepared when it is used in the solid electrolyte. The binder is preferably used in an amount of 0.1 to 50 parts by weight based on 100 parts by weight of the solid electrolyte.

In an embodiment, the first solid electrolyte and the second solid electrolyte can each independently further comprise a conducting agent. The conducting agent is not particularly limited, and can generally be any material so long as it has a suitable conductivity without causing chemical changes in the battery that is to be formed. Examples of the conductive material include graphite such as natural graphite or artificial graphite; carbon blacks such as acetylene black, Denka black, Ketjen black, channel black, lamp black, and thermal black; conductive fibers such as carbon fibers and metallic fibers; conductive metal oxides such as titanium oxide; and metallic powders such as aluminum powder or nickel powder.

In an embodiment, the first solid electrolyte and the second solid electrolyte can each independently further comprise a filler that is electronically and ionically insulating. The filler can impart mechanical robustness to the solid electrolyte. Fillers can include, but are not limited to glass fibers, insulating polymers (e.g., polystyrene and the like), or a combination thereof.

In some embodiments, the first surface has a first surface energy towards the deposition metal and the second surface has a second surface energy towards the deposition metal, and wherein the first surface energy is greater than the second surface energy, the first surface has a first charge transfer resistance for deposition of the deposition metal and the second surface has a second charge transfer resistance for deposition of the deposition metal, and wherein the first charge transfer resistance is greater than the second charge transfer resistance, or both.

For example, in an embodiment, the first surface has a first surface energy towards the deposition metal and the second surface has a second surface energy towards the deposition metal, and wherein the first surface energy is greater than the second surface energy. Surface energy between the deposition metal and the first and second surfaces can be measured by dropping a droplet of molten metal onto a surface and measuring the contact angle between the metal and the surface. Contact angle is related to surface energy through the Young-Laplace equation. See, e.g., Sharafi et al., Chemistry of Materials, 2017, 29(18), 7961, the content of which is incorporated herein by reference in its entirety.

In an embodiment, the first surface has as first charge transfer resistance for deposition of the deposition metal and the second surface has a second charge transfer resistance for deposition of the deposition metal, and the first charge transfer resistance is greater than the second charge transfer resistance. For example, a ratio of the first charge transfer resistance to the second charge transfer resistance is greater than 30:1, e.g., 30:1 to 1000:1, 40:1 to 800:1, or 50:1 to 600:1. Charge transfer resistance can be measured by making a cell containing the following components in the following order: current collector; porous electrolyte with pores containing a given amount of metal; separator; metal foil; and current collector. The charge transfer resistance can be measured by electrochemical impedance spectroscopy (EIS). The charge transfer resistance for the porous, metal-containing electrolyte is equal to $R_{ct}f_{wetted}/(aL)$, where $R_{ct}$ is the charge transfer per interfacial area, $f_{wetted}$ is the fraction of electrolyte surface area that is in contact with the metal (which ranges from 0 to 1; for example, it is equal to about 0.5 if only half of the pore surface area is in contact with the metal), a is the surface area per volume of electrolyte, and L is the thickness of the porous electrolyte. There are several physical phenomena which influence the charge-transfer resistance. There is the reaction-rate constant for the reaction of the ion (from the ion-transporting phase at the surface of the electrolyte) with the electron (from the electron-transporting phase, here the deposited metal), which is quantified by a physical parameter termed the exchange-current density.

In an embodiment, the surface of the electrolyte may comprise a coating. When the coating is present, the charge transfer resistance includes both the exchange-current density and the resistance to transport of the depositing metal through the coating, which is often termed a film resistance or "solid-electrolyte interphase resistance". The film resistance is equal to $T/\kappa_{coating}$, where T is the thickness of the coating and $\kappa_{coating}$ is the conductivity of the depositing metal through the coating. Thus, the charge-transfer resistance can be increased by coating the surface with a material with low conductivity for the depositing metal, and by increasing the thickness of the coating.

In an embodiment, the first surface has both a first surface energy towards the deposition metal, the second surface has a second surface energy towards the deposition metal, and the first surface energy is greater than the second surface energy, and the first surface has a first charge transfer resistance for deposition of the deposition metal, the second surface has a second charge transfer resistance for deposition of the deposition metal, and the first charge transfer resistance is greater than the second charge transfer resistance.

The solid electrolyte further comprises an adhesive electrolyte layer on the first porous solid electrolyte. The adhesive electrolyte layer can be porous or non-porous. For example, the porosity of the adhesive electrolyte layer can range from 0 (i.e., nonporous) to about 70% porosity. When the adhesive electrolyte layer is nonporous, it may completely block the pores of the first and second solid porous electrolytes at the interface. In an embodiment, the adhesive electrolyte layer is preferably a porous adhesive electrolyte layer, and this may only partially block the pores of the first and second solid porous electrolytes at the interface. In an embodiment, the adhesive electrolyte layer can be nonporous, completely blocking the pores of the first and second solid porous electrolytes at the interface, and may extend into either or both of the anode or buffer regions. When the adhesive electrolyte layer extends into one or both of the anode or buffer regions, it may do so in a gradient fashion, wherein the amount of the adhesive layer composition decreases as distance from the interface of the first and second solid electrolytes increases.

The adhesive electrolyte layer preferably includes an ionically conductive polymer. Exemplary ionically conductive polymers can include but are not limited to polyethylene oxide, polyethylene oxide comprising a metal salt, poly (methyl (meth)acrylate), polypropylene oxide, polyvinylidene fluoride, polystyrene, polyvinyl chloride, polyvinyl alcohol, polyacrylonitrile, polyester sulfide, or a combination thereof. The ionically conductive polymer can optionally further comprise a metal salt, for example LiN$(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof. In some embodiments, the ionically conductive polymer comprises the metal salt, and is preferably a polyethylene oxide comprising the metal salt. The adhesive electrolyte layer can have a thickness of 0.01 to 10 micrometers. The adhesive electrolyte layer can have an area-specific resistance (thickness/conductivity+contact resistance) of less than 100 Ohm-cm$^2$, preferably 0.001 to 10 Ohm-cm$^2$. The adhesive electrolyte layer can be prepared as a freestanding film that can be placed onto either or both of the porous solid electrolyte layers for assembly. Alternatively, the adhesive electrolyte layer can be coated onto a surface of the first or second porous solid electrolyte layers.

The solid electrolyte can optionally further comprise a current collector disposed on the second solid electrolyte and opposite the first solid electrolyte. The current collector serves to collect electrons by an electrochemical reaction of the active material or to offer electrons required for an electrochemical reaction. The current collector can comprise, for example, copper, nickel, titanium, sintered carbon, stainless steel, or a combination thereof. In an embodiment, the current collector can be surface-treated for example, with carbon, nickel, titanium, or silver. In an embodiment, the current collector can comprise copper, titanium, stainless steel, or a combination thereof. In an embodiment, the current collector can comprise copper or stainless steel that is surface-treated with carbon, nickel, titanium, or silver.

The current collector can be processed to form fine irregularities on the surfaces thereof so as to enhance adhesive strength of the current collector to the solid electrolyte, and can be used in any of various forms including films, sheets, foils, nets, porous structures, foams, and non-woven fabrics.

When considering the design of a battery, there are considerations for how to design the edges of the layers that comprise the battery. The active region of the negative electrode, e.g., the region of the negative electrode that becomes filled with metal during charge, desirably has a smaller length and width than the separator, to reduce the likelihood there is no shorting around the edges of the separator, particularly at the tabs that make electrical contact to the battery terminals. If the separator comprises a brittle glass or ceramic, unsupported areas can be susceptible to cracking or breaking. In some embodiments, the solid electrolyte can further comprise an insulating frame surrounding one or both of the first and second solid electrolytes. The insulating frame can be non-porous. Preferably, the insulating frame surrounds both the first and the second solid electrolyte. The insulating frame can advantageously provide mechanical strength at the edges of the solid electrolyte.

In a specific embodiment, a solid electrolyte for a negative electrode for a secondary battery can comprise a first solid electrolyte having a first surface, and a second solid electrolyte disposed on the first solid electrolyte, the second solid electrolyte having a second surface. The first solid electrolyte and the second solid electrolyte each have an ionic conductivity effective (suitable) for a deposition metal. The first surface and the second surface can each independently further comprise a carbonate, a halogen, an oxide, a polymer, an oxide, a silicide, a phosphide, a sulfide, an oxide, a metal of Groups 2 to 16, or a combination thereof, wherein the first surface and the second surface are different. In an embodiment, the Groups 2 to 16 metal is a metal of Group 2, a transition metal of Groups 3 to 11, and a metal of Group 12, or a metal of Group 2, a transition metal, and a main group metal. In an embodiment, those metals which do not alloy with lithium, such as Fe, may be excepted.

In a very specific embodiment, electrolyte for a negative electrode for a secondary battery can comprise a first solid electrolyte having a first surface and a first coating on the first surface, and a second solid electrolyte disposed on the first solid electrolyte, the second solid electrolyte having a second surface, and a second coating on the second surface. The first solid electrolyte and the second solid electrolyte each have an ionic conductivity effective for a deposition metal. The first coating and the second coating each comprise a carbonate, wherein the carbonate is present as the first coating in a first amount and the carbonate is present as the second coating in a second amount, wherein the first amount is greater than the second amount. Stated another way, the mass ratio of a first coating comprising the carbonate disposed on the first surface relative to the first solid electrolyte can be greater than the mass ratio of a second coating comprising the carbonate disposed on the second surface relative to the second solid electrolyte. Preferably, the mass ratio of the first coating comprising the carbonate disposed on the first surface relative to the first solid electrolyte can decrease continuously across the first region comprising the first solid electrolyte, with the mass ratio of this region being the lowest where the first region meets the second region, and being highest at a side of the first region opposite the second region. Preferably, the carbonate can be the product of the reaction of an oxide electrolyte with water and/or carbon dioxide, for example, from exposing the electrolyte surface to humid air to form a metal carbonate, such as $Li_2CO_3$ or $Na_2CO_3$. The metal carbonate can form a first coating of several nanometers thick on the first surface. The metal carbonate can be present in trace patches on the second surface.

The solid electrolyte of the present disclosure can be particularly useful in an electrode assembly for an electrochemical cell. The electrode assembly can comprise a current collector, a separator, or both, and the solid electrolyte described herein. When the electrode assembly comprises the current collector and the solid electrolyte, the solid electrolyte is disposed on the current collector such that the second solid electrolyte is adjacent to the current collector (e.g., the current collector is disposed on the second solid electrolyte on a side opposite the first solid electrolyte). When the electrode assembly comprises the separator and the solid electrolyte, the solid electrolyte is disposed on the separator such that the first solid electrolyte is adjacent to the separator (e.g., the separator is disposed on the first solid electrolyte on a side opposite the second solid electrolyte). When the electrode assembly comprises the current collector, the separator, and the solid electrolyte, the solid electrolyte is disposed between the current collector and the separator, wherein the separator is adjacent to the first solid electrolyte, and the current collector is adjacent to the second solid electrolyte. The first surface of the first solid electrolyte and the second surface of the second solid electrolyte can define a void (or a pore) which extends through the solid electrolyte, preferably from the current collector to the separator. It is understood that the presence of the adhesive electrolyte layer can disrupt the continuity of a void extending through the solid electrolyte.

The current collector, when present, can be as described above. In a specific embodiment, the current collector comprises copper.

Characteristics of a separator relating to performance of a battery are ionic-conductivity, thermal resistance, resistance to thermal deformation, chemical resistance, mechanical strength, cross-sectional porosity (representing a percentage of the area of pores in a particular cross-section of the separator), and wettability for an electrolyte. As the separator, a porous olefin film such as polyethylene and polypropylene, and an electrolyte can be used. For example, the separator can comprise polyethylene, polypropylene, polyvinylidene fluoride, or a mixed multilayer of two or more layers such as a polyethylene/polypropylene double layered separator, a polyethylene/polypropylene/polyethylene triple layered separator, or a polypropylene/polyethylene/polypropylene triple layered separator. In an embodiment, the separator can comprise a lithium ceramic or a glass ceramic, as described above for the first and second solid electrolytes. The separator can be porous, and a diameter of a pore of the separator can be in a range of about 0.01 micrometer (μm) to about 10 μm, and a thickness of the separator can be in a range of about 5 μm to about 300 μm. In an embodiment, the separator can be a woven or a non-woven fabric comprising an olefin-based polymer such as polypropylene or polyethylene; or a glass fiber.

In an embodiment, the separator can have a composition that is the same as the bulk composition of the first solid electrolyte. Thus, in an embodiment, the separator comprises a lithium ceramic or a glass ceramic as described above. In a specific embodiment, the separator can comprise $Li_7La_3Zr_2O_{12}$. In an embodiment, the separator can have the same composition as both the first solid electrolyte and the second solid electrolyte.

The separator can have a porosity that is the same or different from that of the solid electrolyte. For example, the separator can have a porosity that is less than the porosity of the solid electrolyte, for example a porosity of 1 to 50%, or 1 to 40%, or 1 to 30%, or 1 to 20%, or 1 to 10%, or 1 to 5%. In an embodiment, the separator can be nonporous (i.e., having a porosity of 0%). In a specific embodiment, the separator can have a porosity of 0 to 5%.

The electrode assembly can be prepared according to a variety of methods. Exemplary methods can be as depicted in FIG. 1. For example, a buffer region can be provided by disposing the first porous solid electrolyte 1 onto a nonporous separator 2, forming a first coating unfavorable for metal deposition 3, for example by atomic layer deposition, initiated chemical vapor deposition, or the like, and removing at least a portion of the first coating from the first electrolyte and/or the nonporous separator. An anode region can be provided by disposing the second porous solid electrolyte 5 onto a current collector 4, and optionally, forming a second coating 6 on the surface of the second electrolyte that is favorable for metal deposition (e.g., by atomic layer deposition, chemical vapor deposition, solution-precipitation, or the like). The anode region and the buffer region can then be adhered together through an adhesive electrolyte layer 7.

In an embodiment, the first composition comprising the first solid electrolyte and the first solvent can be disposed onto the substrate (e.g., the separator) to form the first layer, and the second composition comprising the second solid electrolyte and the second solvent can be disposed onto a current collector to form the second layer. The adhesive electrolyte layer can be disposed on the buffer region or the anode region; and the other of the buffer region and the anode region can be disposed on the adhesive electrolyte layer to adhere the buffer region subassembly to the anode region subassembly and form the negative electrode assembly.

As mentioned above, in an embodiment, the method can further comprise removing at least a portion of the first coating from the first surface of the first solid electrolyte, and optionally, cleaning the nonporous separator following the removing of at least a portion of the first coating. Removing at least a portion of the first coating can be by, for example, polishing, laser ablation, chemical etching (e.g., with acid), dissolution by solvent, reactive ion etching, plasma etching, and the like, or a combination thereof. Cleaning the nonporous separator can be by, for example, etching, polishing, and the like, or a combination thereof.

In a specific embodiment, the electrode assembly can be prepared according to a method comprising providing a nonporous separator; disposing a first porous solid electrolyte having a first surface on the nonporous separator, the first solid electrolyte having a first coating on the first surface; providing a current collector; disposing a second porous solid electrolyte on the current collector to form an anode region subassembly, the second porous solid electrolyte having a second surface, wherein a surface of the first coating is less favorable for deposition of the deposition metal than the second surface of the second solid electrolyte; and disposing an adhesive electrolyte between the buffer region subassembly and the anode region subassembly to adhere the buffer region subassembly to the anode region subassembly and form the negative electrode assembly.

In the above methods, the solvents can be any solvent capable of forming the desired composition, which can be in the form of a homogenous solution or a slurry. For example, the solvent can be an organic solvent comprising methanol, ethanol, propanol, butanol, toluene, xylene, acetone, cyclohexanone, trichloroethylene, and the like, or combination thereof.

Another aspect of the present disclosure is an electrochemical cell. The electrochemical cell can comprise a positive electrode and the above-described electrode assembly. The electrochemical cell can have any suitable shape, can be prismatic or cylindrical, and can be fabricated in a shape such as a cylinder, a prism, a disk, or a sheet. The shape of the electrochemical cell is not limited to the above mentioned shapes, and can be shaped in various forms other than the foregoing.

In an embodiment, the electrochemical cell can further comprise the deposition metal disposed on the current collector, the first surface of the first solid electrolyte, the second surface of the second solid electrolyte, or a combination thereof. In an embodiment, the electrochemical cell can further comprise the deposition metal disposed on the current collector, the second surface of the second solid electrolyte, or a combination thereof and the first surface of the first solid electrolyte can be substantially free of the deposition metal. As used herein, the first surface of the first solid electrolyte being "substantially free" of the deposition metal can refer to an amount of the deposition metal on the first surface being less than or equal to 25%, or less than or equal to 20%, or less than or equal to 10%, or less than or equal to 5%, or less than or equal to 1%, of the total amount of the deposition metal. In an embodiment, the portion of the void adjacent to the separator and defined by the first surface of the first solid electrolyte can be substantially free of the deposition metal. For example, the deposition metal in the portion of the void adjacent to the separator and defined by the first surface of the first solid electrolyte can be present such that it occupies less than or equal to 80%, or less than or equal to 50%, or less than or equal to 20%, or less than or equal to 10%, or less than or equal to 5%, of the area-average void space adjacent to the separator. Preferably, the amount of deposition metal disposed on the first surface is less than an amount of the deposition metal disposed on the second surface. Similarly, an amount of the deposition metal disposed in the portion of the void adjacent to the separator and defined by the first surface (i.e., in the "first region", also referred to as the "buffer region") can be less than an amount of the deposition metal in the portion of the void defined by the second surface (i.e., in the "second region", also referred to as the "negative electrode region" or "anode region"). In an embodiment, at least a portion of the void adjacent to the separator and defined by the first surface of the first solid electrolyte is substantially free of the deposition metal at all states of charge of the electrochemical cell.

In an embodiment, all of the deposition metal in the cell originates from the positive-electrode material, and is deposited into the negative electrode when the cell is charged. In other embodiments, some amount of the deposition metal will be included in the electrode assembly prior to cell assembly. The deposition metal can be included as a layer of porous or nonporous metal foil disposed between the current collector and the second electrolyte. The deposition metal can be deposited into the pores of the second electrolyte by various sputtering techniques such as RF-assisted sputtering or RF magnetron sputtering, chemical vapor deposition (CVD), chemical solution deposition (CSD), electrostatic spray deposition (ESD), vacuum thermal vapor deposition (VD), plasma/laser assisted deposition techniques, electrochemical deposition prior to assembly with the positive electrode, and the like.

An exemplary electrochemical cell according to the present disclosure can be as shown in FIG. 2. The electrochemical cell 8 shown in FIG. 2 includes a current collector 9, a solid electrolyte 10, a separator 11, and a cathode 12. The solid electrolyte 10 includes a buffer region $L_1$ comprising the first solid electrolyte (also referred to herein as the first region). The buffer region $L_1$ is positioned between the separator 11 and an adhesive electrolyte layer 17 which is adjacent to the negative electrode region $L_2$ of the solid electrolyte, wherein the negative electrode region comprises the second solid electrolyte (also referred to herein as the second region) sized to allow for a volume of metal (e.g., lithium, sodium, magnesium, and the like) to deposit, accommodating any extra metal volume that may be needed for metal plating at low density, tolerances in cathode capacity, in-plane metal redistribution over the course of cycling, or other tolerances. The first surface 14 of the first solid electrolyte in the buffer region is unfavorable for metal deposition. The second surface 15 of the second solid electrolyte in the negative electrode region is favorable for metal deposition. The deposited metal, which preferentially deposits on the second surface is labelled 16 in FIG. 2. By making deposition of metal less favorable in the buffer region Li than in the negative electrode region $L_2$, the metal can be driven to deposit preferentially in the negative electrode region, thereby avoiding stress on the separator, as the void adjacent to the separator remains substantially free of deposition metal.

Advantageously, deposited metal will charge into/discharge from the pores of the negative electrode region over most conditions of operation, without substantial filling of the pores in the buffer region, even at a state of full charge of the electrochemical cell.

This can be accomplished by the first surface having high surface energy towards the deposition metal, a low surface area, and/or a surface with high charge-transfer resistance. Such a surface may be achieved through selection of the electrolyte and/or by inclusion of a surface coating. In contrast, the second surface of the electrolyte in the negative electrode region is favorable for metal deposition. This can be accomplished by the second surface having low surface energy towards the deposited metal, a high surface area, and/or a low charge-transfer resistance. Such a surface may be achieved through selection of the electrolyte and/or by a surface coating. During charge, metal will deposit into the void space of the negative electrode region, and some may grow into some of the void space of the buffer region. In the fully charged state, unfilled void space, labelled 13 in FIG. 2, will remain in the buffer region (i.e., the region defined by length Li in FIG. 2, adjacent to the separator 11).

In a very specific embodiment, an electrochemical cell according to the present disclosure can comprise a positive electrode, a separator disposed adjacent to the positive electrode, a negative electrode, and a current collector disposed on the second porous solid electrolyte and opposite the first porous solid electrolyte. An adhesive electrolyte layer is positioned between the first porous solid electrolyte and the second porous solid electrolyte. The negative electrode comprises a first porous solid electrolyte adjacent to the separator and opposite the positive electrode, and a second porous solid electrolyte adjacent to adhesive electrolyte layer and opposite the separator. A first surface of the first porous solid electrolyte and a second surface of the second solid electrolyte are different in composition, structure, or both. In some embodiments, the first surface of the first porous solid electrolyte comprises a coating which has a greater surface energy towards a deposition metal than a surface energy of the second porous solid electrolyte, or a greater charge transfer resistance for the deposition metal than a charge transfer resistance for deposition metal of the second porous solid electrolyte. In some embodiments, the electrochemical cell further comprises a deposition metal, wherein the deposition metal is disposed on the second surface of the second porous solid electrolyte.

The positive electrode can be prepared by forming a positive active material layer including a positive active material on a current collector. The positive active material layer may be prepared using a vapor-state method or a solid state method. Examples of the vapor-state method include pulse laser deposition ("PLD"), sputtering deposition, and chemical vapor deposition ("CVD"). However, the vapor state method is not limited thereto, and any suitable vaporization method known in the art may be used. Examples of the solid-state method include a sintering method, a sol-gel method, a doctor-blade method, screen printing, slurry casting, and powder compression. However, the solid-state method is not limited thereto, and any suitable solid-state method known in the art may be used.

The deposition metal can be lithium, and the positive active material can be any of various suitable materials that are used in lithium batteries. For example, the positive active material can be a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \le a \le 1.8$ and $0 \le b \le 0.5$; $Li_aE_{1-b}M_bO_{2-c}D_c$ wherein $0.90 \le a \le 1.8$, $0 \le b \le 0.5$, and $0 \le c \le 0.05$; $LiE_{2-b}M_bO_{4-c}D_c$ wherein $0 \le b \le 0.5$ and $0 \le c \le 0.05$; $Li_aNi_{1-b-c}Co_bM_cD_\alpha$ wherein $0.90 \le a \le 1.8$, $0 \le b \le 0.5$, $0 \le c \le 0.05$, and $0 < \alpha \le 2$; $Li_aNi_{1-b-c}Co_bM_cO_{2-\alpha}X_\alpha$ wherein $0.90 \le a \le 1.8$, $0 \le b \le 0.5$, $0 \le c \le 0.05$, and $0 < \alpha < 2$; $Li_aNi_{1-b-c}Co_bM_cO_{2-\alpha}X_2$ wherein $0.90 \le a \le 1.8$, $0 \le b \le 0.5$, $0 \le c \le 0.05$, and $0 < \alpha < 2$; $Li_aNi_{1-b-c}Mn_bM_cD_\alpha$ wherein $0.90 \le a \le 1.8$, $0 \le b \le 0.5$, $0 \le c \le 0.05$, and $0 < \alpha \le 2$; $Li_aNi_{1-b-c}Mn_bM_cO_{2-\alpha}X_\alpha$ wherein $0.90 \le a \le 1.8$, $0 \le b \le 0.5$, $0 \le c \le 0.05$, and $0 < \alpha < 2$; $Li_aNi_{1-b-c}Mn_bM_cO_{2-\alpha}X_2$ wherein $0.90 \le a \le 1.8$, $0 \le b \le 0.5$, $0 \le c \le 0.05$, and $0 < \alpha < 2$; $Li_aNi_bE_cG_dO_2$ wherein $0.90 \le a \le 1.8$, $0 \le b \le 0.9$, $0 \le c \le 0.5$, and $0.001 \le d \le 0.1$; $Li_aNi_bCo_cMn_dGeO_2$ wherein $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ wherein $0.90 \le a \le 1.8$ and $0.001 \le b \le 0.1$; $Li_aCoG_bO_2$ wherein $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ wherein $0.90 \le a \le 1.8$ and $0.001 \le b \le 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3 (0 \le f \le 2)$; $Li_{(3-f)}Fe_2(PO_4)_3$ wherein $0 \le f \le 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where $x=1$ or $2$, $LiNi_{1-x}Mn_xO_{2x}$ where $0<x<1$, $LiNi_{1-x-y}Co_xMn_yO_2$ where $0 \le x \le 0.5$ and $0 \le y \le 0.5$, $LiFePO_4$, $TiS_2$, $FeS_2$, $TiS_3$, and $FeS_3$.

In some embodiments, the deposition metal can be sodium, and the positive active material can be any of various suitable materials that are used in sodium batteries. For example, the positive active material can be a compound in which sodium intercalation reversibly occurs, such as an oxide of the formula $NaM1_aO_2$ (e.g., $NaFeO_2$, $NaMnO_2$, $NaNiO_2$, or $NaCoO_2$); or an oxide represented by the formula $NaMn_{1-a}M1_aO_2$, wherein M1 is at least one transition metal element, and $0 \le a < 1$. Representative positive active materials include $Na[Ni_{1/2}Mn_{1/2}]O_2$, $Na_{2/3}[Fe_{1/2}Mn_{1/2}]O_2$, and the like; an oxide represented by Na44Mn-$aM1_aO_2$, an oxide represented by $Na_{0.7}Mn_{1-a}M1_aO_{2.05}$ (wherein M1 is at least one transition metal element, and $0 \le a < 1$); an oxide represented by $Na_bM2_cSi_{12}O_{30}$ as $Na_6Fe_2Si_{12}O_{30}$ or $Na_2Fe_5Si_{12}O$ (wherein M2 is at least one transition metal element, $2 \le b \le 6$, and $2 \le c \le 5$); an oxide represented by $Na_dM3_eSi_6O_{18}$ such as $Na_2Fe_2Si_6O_{18}$ or $Na_2MnFeSi_6O_{18}$ (wherein M3 is at least one transition metal element, $3 \le d \le 6$, and $1 \le e \le 2$); an oxide represented by $Na_fM4_gSi_2O_6$ such as $Na_2FeSiO_6$ (wherein M4 is at least one element selected from transition metal elements, magnesium (Mg) and aluminum (Al), $1 \le f \le 2$, and $1 \le g \le 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$; a fluoride represented by $Na_bM5_F_6$ such as $Na_3FeF_6$ or $Na_2MnF_6$ (wherein M5 is at least one transition metal element, and $2 \le h \le 3$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}]O_2$ and $Na_{2/3}[Fe_{1/2}Mn_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$. A combination comprising at least one of the foregoing positive active materials can be used.

In some embodiments, the deposition metal can be magnesium, and the positive active material can be any of various suitable materials that are used in magnesium batteries. For example, the positive active material can be $TiS_2$, $Mo_6S_{8-y}Se_y$, wherein $0 \le y \le 2$, $V_2O_5$, $MnO_2$, $MoS_2$, $WSe_2$, and the like.

In addition, the positive active material layer may further include a conductive agent and a binder. Any suitable conductive agent and binder used in the art may be used.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive electrode can further comprise an electrolyte. When present, the electrolyte can comprise one or more salts dissolved in one or more solvents, ionic liquid, gel, ionogel, highly concentrated, or a solid. In some embodiments, the electrolyte of the positive electrode can be a solid electrolyte and can comprise a ceramic, glass ceramic, or polymer. The solid electrolyte can be of the same composition as the electrolyte in the separator, or it can be selected to be more electrochemically stable with the positive active material.

The electrochemical cell can be made by a method comprising disposing a positive electrode on the electrode assembly of the present disclosure to provide the electrochemical cell.

This disclosure is further illustrated by the following examples, which are non-limiting.

EXAMPLES

An exemplary method of making an electrode assembly according to the present disclosure is describe below. Garnet electrolyte powder having a composition of $Li_7La_3M_zZr_{2-z}O_{12}$, where M is Al, Ga, In, Sc, Cr, Fe, Ta, or Nb; M2 is Ti, Zr, Hf, or Ge and $0 \leq z < 2$, is mixed with a pore former (e.g., starch) and a carrier solvent, tape cast onto a polyethylene carrier film, dried to remove the solvent and pore former, and sintered at 1100° C. to form the anode region. The thickness after sintering is about 50 micrometers and the porosity is about 50%. After sintering, all handling of the porous anode is done in a dry atmosphere with dew point $\leq -20°$ C. 20 micrometer-thick Li metal on 10 micrometer-thick Cu foil is placed on the back of the porous anode region to form the anode sub-assembly.

Garnet of the same composition is tape cast (without pore former) and sintered at 1100° C. to form a dense (<5% pore volume) separator. The thickness of the separator is about 100 micrometers.

Garnet of the same composition is mixed with pore former and carrier solvent, screen printed onto the dense separator, dried, and sintered to form the buffer region-separator subassembly. The thickness of the porous region is about 5 micrometers and the porosity is about 40%. The opposing side of the separator (i.e., the side that will end up facing the cathode) is masked with metallized masking tape to prevent exposure to humid air. The subassembly is exposed to air of 40% humidity for 4 hours at room temperature, after which all exposed surface area is covered with a thin (<5 nm) layer of $Li_2CO_3$, which is has both high surface energy and high charge-transfer resistance for lithium metal deposition. A cloth soaked in an acid (e.g., 1 M HCl) is wiped over the face of the porous region to dissolve and remove the $Li_2CO_3$ from the face of the subassembly, after which the buffer-separator sub-assembly is immediately transferred to the dry atmosphere.

An adhesive rubbery electrolyte, cross-linked poly(ethylene glycol) methyl ether acrylate (CPMEA) with lithium bistrifluoromethanesulfonylimide (LiTFSI) salt, was synthesized in acetonitrile carrier solvent using the method described by W. Zhou, S. Wang, Y. Li, S. Xin, A. Manthiram, and J. B. Goodenough, J. Am. Chem. Soc. 2016 (vol. 138) p. 9385. The solution is spray coated onto the surface of the buffer-separator sub-assembly and dried to remove the carrier solvent. The thickness of the as-coated adhesive electrolyte is between 1 and 5 micrometers. The masking tape on the opposing side of the separator is peeled off.

The separator-buffer sub-assembly is placed on the anode sub-assembly. The separator-anode assembly is pressed isostatically at room temperature to ensure good contact across all of the component regions.

To complete the assembly of the cell, a cathode containing liquid electrolyte is placed on the opposing side of the separator. For example, $LiCoO_2$ is mixed with 3 wt % conductive carbon and 3 wt % PVDF binder in NMP, slurry coated onto 10 micrometer-thick Al foil, and dried to form a porous cathode about 100 micrometers thick with about 25% porosity. A liquid electrolyte such as an ionic liquid containing a lithium salt such as LiTFSI is infiltrated into the pores of the cathode. The cathode is placed on the separator-anode assembly.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

"Group" means a group of the Periodic Table of the Elements according to the International Union of Pure and Applied Chemistry ("IUPAC") Group 1-18 group classification system.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid electrolyte for a negative electrode of a secondary battery, the solid electrolyte comprising:
   a first porous solid electrolyte having a first surface;
   a first coating on the first surface of the first porous solid electrolyte;
   an adhesive electrolyte layer on the first porous solid electrolyte; and
   a second porous solid electrolyte on the adhesive electrolyte layer, the second porous solid electrolyte having a second surface,
   wherein the first porous solid electrolyte and the second porous solid electrolyte each have an ionic conductivity effective for a deposition metal, and
   wherein a surface of the first coating is less favorable for deposition of the deposition metal than the second surface of the second solid electrolyte.

2. The solid electrolyte of claim 1, wherein the adhesive electrolyte layer is porous.

3. The solid electrolyte of claim 1, wherein the adhesive electrolyte layer comprises an ionically conductive polymer.

4. The solid electrolyte of claim 3, wherein the ionically conductive polymer comprises polyethylene oxide, polyethylene oxide comprising a metal salt, poly(methyl (meth)acrylate), polypropylene oxide, polyvinylidene fluoride, polystyrene, polyvinyl chloride, polyvinyl alcohol, polyacrylonitrile, polyester sulfide, or a combination thereof.

5. The solid electrolyte of claim 3, wherein the ionically conductive polymer comprises $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, $NaAsF_6$, or a combination thereof.

6. The solid electrolyte of claim 1, wherein the adhesive electrolyte layer has a thickness of 0.01 to 10 micrometers.

7. The solid electrolyte of claim 1, wherein the deposition metal is Li.

8. The solid electrolyte of claim 1, wherein the first solid electrolyte and the second solid electrolyte each independently have an ionic conductivity for Li of at least $10^{-3}$ S/m.

9. The solid electrolyte of claim 1, wherein the first coating comprises a carbonate, a halogen, an oxide, a polymer, a silicide, a phosphide, a sulfide, a metal of Groups 2 to 16, or a combination thereof.

10. The solid electrolyte of claim 9, wherein the polymer comprises a polyacetal, a polyolefin, a poly(alkylene oxide), a poly(meth)acrylate, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, a polyvinylidene fluoride, or a combination thereof.

11. The solid electrolyte of claim 9, wherein the first coating comprises lithium carbonate.

12. The solid electrolyte of claim 1, further comprising a current collector disposed on the second porous solid electrolyte and opposite the adhesive electrolyte layer.

13. The solid electrolyte of claim 12, further comprising a layer of the deposition metal disposed between the current collector and the second porous solid electrolyte.

14. The solid electrolyte of claim 13, wherein the deposition metal comprises lithium.

15. An electrode assembly for an electrochemical cell, the electrode assembly comprising:
   the solid electrolyte of claim 1;
   a separator disposed on the first porous solid electrolyte of the solid electrolyte; and
   a current collector disposed on the second porous solid electrolyte of the solid electrolyte.

16. An electrochemical cell comprising:
   a positive electrode; and
   the electrode assembly of claim 15 disposed on the positive electrode.

17. The electrochemical cell of claim 16, further comprising the deposition metal disposed on the current collector, the first surface of the first solid electrolyte, the second surface of the second solid electrolyte, or a combination thereof.

18. An electrochemical cell comprising:
   a positive electrode;
   a separator disposed adjacent to the positive electrode; and
   negative electrode comprising
      a first porous solid electrolyte adjacent to the separator and opposite the positive electrode, the first porous solid electrolyte having a first surface,
      a first coating on the first surface of the first solid electrolyte,
      an adhesive electrolyte layer on the first porous solid electrolyte,
      a second porous solid electrolyte adjacent to the adhesive electrolyte layer and opposite the first porous solid electrolyte, the second porous solid electrolyte having a second surface, and
   a current collector disposed on the second porous solid electrolyte and opposite the adhesive electrolyte layer,
   wherein a surface of the first coating is less favorable for deposition of lithium metal than the second surface of the second solid electrolyte.

* * * * *